(12) United States Patent
Robb

(10) Patent No.: US 6,225,988 B1
(45) Date of Patent: *May 1, 2001

(54) ARTICLE TO BE WORN ON THE TIP OF A FINGER AS A STYLUS

(76) Inventor: Karl Robb, 4182 Culpeper La., Fairfax, VA (US) 22030-8123

( * ) Notice: Subject to any disclaimer, the term of this patent is extended or adjusted under 35 U.S.C. 154(b) by 0 days.

This patent is subject to a terminal disclaimer.

(21) Appl. No.: 09/579,426

(22) Filed: May 26, 2000

Related U.S. Application Data

(63) Continuation-in-part of application No. 09/020,854, filed on Feb. 9, 1998, now Pat. No. 6,075,189.

(51) Int. Cl.$^7$ ..................................................... G09G 5/00
(52) U.S. Cl. ........................................... 345/179; 345/173
(58) Field of Search .................................. 345/179, 173, 345/180–184; D14/106, 114; 84/423 R, 744; 984/61, 156

(56) References Cited

U.S. PATENT DOCUMENTS

| | | |
|---|---|---|
| 1,184,710 | 5/1916 | Bauman . |
| 1,444,982 | 8/1923 | Orth . |
| 3,789,720 | 2/1974 | McIntyre ................................. 84/322 |
| 3,927,595 | 12/1975 | Ferguson ................................. 84/322 |
| 5,323,677 | 6/1994 | Knutson ................................. 84/322 |
| 5,444,462 * | 8/1995 | Wambach ............................ 345/158 |
| 5,453,759 | 9/1995 | Seebach ............................... 345/158 |
| 5,559,301 | 9/1996 | Bryan, Jr. et al. ...................... 84/653 |
| 6,075,189 * | 6/2000 | Robb ..................................... 84/322 |

OTHER PUBLICATIONS iGo, catalog entitled Solutions For People On The Go, "Keep your stylus at your fingertip", p. 8 (1999).

Concept Kitchen, "Concept Kitchen to Unveil New Handheld Stylus Alternative At Comdex" posted on web site at URL = http://www2.conceptkitchen.com/press/pr/981111.shtml (Dec. 1998).

Absracted–Pub–No: JP11134103 "Finger Stylus for Touch Screen and Small Computer" Publication Date May 21, 1999.*

* cited by examiner

Primary Examiner—Bipin Shalwala
Assistant Examiner—Richardo Osorio
(74) Attorney, Agent, or Firm—Roberts Abokhair & Mardula, LLC

(57) ABSTRACT

A screen operator or artificial finger tip for entering commands and data into a personal data device, such as an electronic notebook, by contacting the screen of the personal data device. The screen operator comprises a partially rigid base that encircles the finger, generally conforming to the finger, and a rigid tip member which projects forwardly from the base to contact the screen. The extreme tip of the tip member is of reduced diameter at the point of contact with the screen. The base is tubular (preferably with a gap) and resiliently grips the finger. A hook member extends downwardly and back from the tip member to engage the underside of the user's finger tip. The hook member functions to retain the screen operator on the user's finger tip.

23 Claims, 3 Drawing Sheets

ARTICLE TO BE WORN ON THE TIP OF A FINGER AS A STYLUS

RELATED APPLICATIONS

This application is a continuation-in-part of U.S. patent application Ser. No. 09/020,854 filed Feb. 9, 1998, now U.S. Pat. No. 6,075,189, by Karl A. Robb, entitled "Artificial Finger Tip". The Ser. No. 09/020,854 application is incorporated herein by reference in its entirety for all purposes.

BACKGROUND OF THE INVENTION

1. Field of the Invention

The present invention relates generally to devices for operating touch screens. More particularly, the present invention relates to a device for fitting to an appendage of a person so as to adapt the appendage for operating controls on a screen of an automated data device.

2. Background Information

Personal data devices for storing and handling information have come into widespread use in recent years. Some devices have been developed that are intended to assist individuals as automated secretaries (also known as "personal digital assistants" or PDAs). An example is a device known as an electronic notebook. An electronic notebook is a data processing device that has a microprocessor and a display screen, and is adapted to store information and to categorize or otherwise handle the information. Personal data devices may be programmed to enable a user to enter data and control commands that determine how the data is entered, stored, and manipulated. Examples of personal data devices include the Palm series, marketed by Palm, Inc. (formerly 3Com Corp.) of Santa Clara, Calif. Apple Computers initiated the handheld computing market with the Newton line of products. Other similar products are available on the market. Applications for these devices are growing on a daily basis.

Typically, such devices receive control commands via very small electrical switches, called microswitches, which are integrated into the display screen. A user inputs commands and information into the device by touching a portion of the display screen where a microswitch is located. A display portion of the display screen portrays images corresponding to screen positions that are associated with available input selections (commands or information). The display portion may also show a screen position being contacted, as a visual feedback to the user that an entry has been made.

As personal data devices may be quite small and compact, it follows that the screens are also small. Accordingly, each of the microswitches on the screen is quite small and they may be crowded quite closely together. Successfully entering a command is dependent upon having a suitable utensil for contacting the screen in a limited area in a manner that will operate a selected microswitch, but will not operate other, adjacent microswitches inadvertently. Typically, the personal data device is provided with an elongated stylus that is held in the user's hand and that may be placed in contact with the screen at a selected position to operate a microswitch to carry out a particular command or to enter data.

Although a conventional stylus can operate its personal data device, it is slightly unwieldy for its purpose. A smaller device that does not require grasping by the palm or by several fingers or both may actually expedite operation of the personal data device.

Devices worn upon a single finger and having forward projections for operating equipment are known. Picks for stringed musical instruments offer examples. U.S. Pat. No. 1,444,982, issued to Harold Orth on Feb. 13, 1923, as well as U.S. Pat. No. 5,323,677, issued to John A. Knutson on Jun. 28, 1994, each illustrate picks for musical instruments.

U.S. Pat. No. 1,184,710, issued to Charles Baumann on May 30, 1916, shows a guard to protect a user while slicing.

U.S. Pat. No. 5,453,759, issued to Jurgen Seebach on Sep. 26, 1995, illustrates a communications device worn on the finger. The device of Seebach is not intended to make contact with other objects.

Concept Kitchen, Inc. markets a device known as the fingerTip™ stylus that is intended to be worn on a finger tip for use in operating the touch screen of a personal digital assistant. The device, as sold, does not securely grip the finger tip of a user and is prone to falling off.

These known devices all mount on the tip of a finger for accomplishing various tasks. None of these devices provides a finger tip worn device that can operate a touch screen and remains securely on the finger tip.

Thus, what is needed is a finger tip worn implement that can operate a touch screen and remains securely on the finger tip.

Furthermore, the know devices lack removable and interchangeable projections that may be used with a variety of touch screens having different actuation specification.

Thus, what is also needed is a finger tip worn implement that has removable and interchangeable projections.

SUMMARY OF THE INVENTION

The present invention provides a finger worn artificial finger tip, or screen operator, suitable for operating microswitches formed in touch screens of personal data devices. The screen operator envelops and is retained on a finger of the user. The user obstructs less of the visual field of the screen and more dexterously controls contact of the screen when employing the novel screen operator, thereby expediting entering of commands to the personal data device.

The screen operator comprises a flexible base for securement to the finger and a removable rigid projection for contacting the screen of the personal data device. The base may be manipulated into comfortable and effective engagement conforming to and cooperating with the finger. The projection snap fits or otherwise removably engages the base. Several points of connection of tip to base are provided, so that attachment is dependable and reliable, and also steady in that the geometric position of the tip relative to the base remain constant and predictable in use.

Preferably, a selection of projections are provided, each having a hard tip different in dimensions from the others. The different dimensions or sizes corresponds to fine, intermediate, and coarse sized tips. Thus the user is afforded an opportunity to select among several sizes a tip that is convenient and effective for him or her. The decision is based upon ease of visual access to the screen, dimensions of the switching area of the screen, and other considerations that affect effectiveness of any particular selected tip.

Accordingly, it is one object of the invention to provide a screen operator worn on a finger for contacting the screen of a personal data device to effect commands and to enter data.

It is an object of the present invention to provide a finger tip worn implement that can operate a touch screen and remains securely on the finger tip.

It is another object of the present invention to provide a finger tip worn implement that has removable and interchangeable projections.

The above objects are achieved by a screen operator for effecting operative contact with a touch screen. The screen operator includes a flexible base, a tip member and a retention hook. The flexible base includes a pair of opposed arcuate members sized to resiliently grip a finger, each of the arcuate members terminating in an extreme end, the extreme ends being spaced apart from one another by a gap. The tip member is engaged with the base and has a slender rigid projection with a tip end, the tip end being sized as a touch screen stylus tip. The retention hook extends away from the tip member to grip an underside of the finger.

According to one embodiment, the tip member is engaged to the base via frictional engagement to permit exchange of different size tip members.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

As utilized in this description, personal data devices include small electronic devices utilized as a portable personal computer capable of storing and retrieving information such as calendars, phone books, and the like. Examples include devices such as the Palm series, produced by Palm, Inc. of Santa Clara, Calif., the Jornada series, produced by Hewlett-Packard, Inc. of Palo Alto, Calif., and the Visor series, produced by Handspring, Inc. of Mountain View, Calif., to name a few. These devices include a screen to manipulate its functions. Various sections of the display screen are touched by a screen operator to manipulate the functions of the instrument. A screen operator is usually an instrument in the shape of a pen or a pencil, having a point of small enough size to allow the user to select the various functions of the personal data device.

A screen operator according to the present invention provides operative contact with a touch screen. Characteristic of such a screen operator are a flexible base, a tip member, an elongate member, and a retention hook. The flexible base includes a pair of opposed arcuate members sized to resiliently grip a finger. Each of the pair of opposed arcuate members is shaped to engage a surface of the finger. Also, each of the arcuate members terminates in an extreme end, the extreme ends being spaced apart from one another by a gap. The tip member has a slender rigid projection with a tip end, the tip end being sized as a touch screen stylus tip. The elongated member connects the flexible base to the tip member. The retention hook extends away from the tip member to grip an underside of the finger. The flexible base, the tip member, the elongated member, and the retention hook are preferably unitarily formed together as a single piece.

Figure 1:
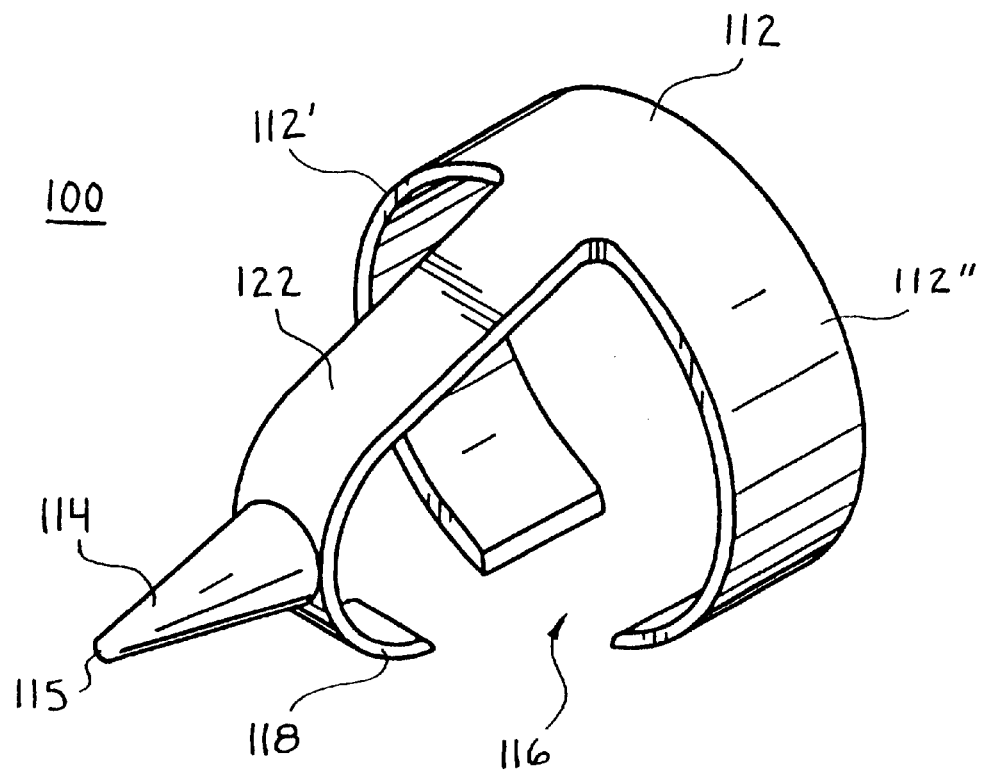
FIG. 1 illustrates a perspective view of a screen operator according to a preferred embodiment of the present invention.

Referring to FIG. 1, a perspective view of a screen operator 100 according to a preferred embodiment of the present invention is illustrated. The screen operator 100 has a base 112 dimensioned and configured to engage the finger 2 of a user (as shown in phantom in FIG. 2), and a tip member 114. The tip member 114 has a slender projection that terminates in a tip end 115. The tip end 115 is sized for use as a touch screen stylus tip.

The base 112 engages the finger 2 by full or partial encirclement. Preferably, the base 112 is generally tubular, other than having a gap 116. The tubular configuration promotes axial alignment of the screen operator 100 with the finger 2 of the user. The base 112 may be viewed as including a pair of opposed arcuate members 112', 112". Together the opposed arcuate members 112', 112" encircle at least halfway around the finger 2.

Figure 2:
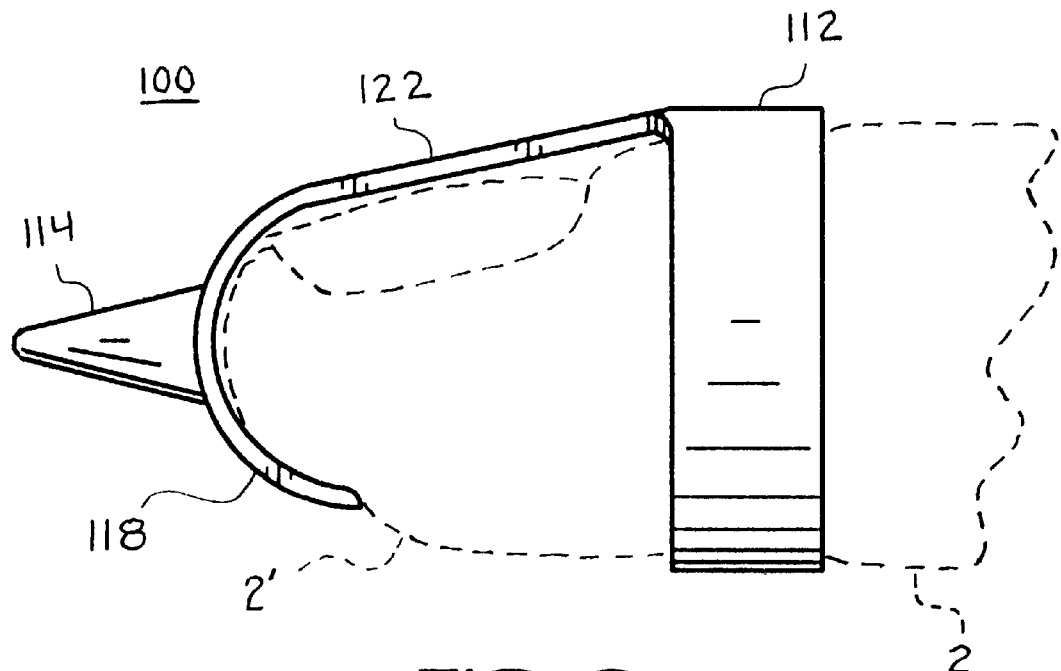
FIG. 2 illustrates a plan view of the screen operator of FIG. 1, with a user's finger shown in phantom.

The base 112 is fabricated from a material or materials providing partial rigidity. That is, the base 112 is sufficiently flexible to deform under manual pressure, yet sufficiently rigid to maintain its configuration after deformation in the absence of manual pressure. The gap 116 allows the circumference of the base 112 to be adjusted for different fingers. After the base 112 is placed over a finger (as shown in FIG. 2), it conforms to the finger and maintains its grip by rigidity. Any suitable material exhibiting the above characteristics will be adequate. It is, however, preferred that the base 112 be somewhat flexible and resilient at least at its surface for comfort. One suitable construction is to use a core of bendable metal (not shown) surrounded by flexible rubber-like material, such as soft or foamed synthetic resin (not shown).

One aspect of the base 112 is that the opposed arcuate members 112', 112" flex from a connection point of the base 112 to the elongated top member 122. This is distinct from a structure where finger-gripping members flex from a connection point at a tip member.

Referring to FIG. 2, a plan view of the screen operator 100 of FIG. 1, with a user's finger 2 shown in phantom, is illustrated. The screen operator 100 is slipped over a finger 2 of a user, and may then be placed in contact with screen of a personal data device (not shown). Contact of the tip of the screen operator 100 with the screen compresses the screen, thereby causing microswitches to close and complete electrical circuits for entering data and carrying out commands. The screen operator 100 may be placed as desired on a finger 2, within limits imposed by length of the elongated top member 122, which connects the base 112 to the tip member 114. A retention hook 118 extends downwardly and back from the tip member 114 to grip the underside 2' of the finger 2 of the user. The retention hook functions to substantially enhance retention of the screen operator 100 on the finger 2 of the user.

According to this embodiment, the screen operator 100 is preferably formed as a unitary single piece. It is also preferable to form the screen operator 100 from a plastic composition.

Figure 3:
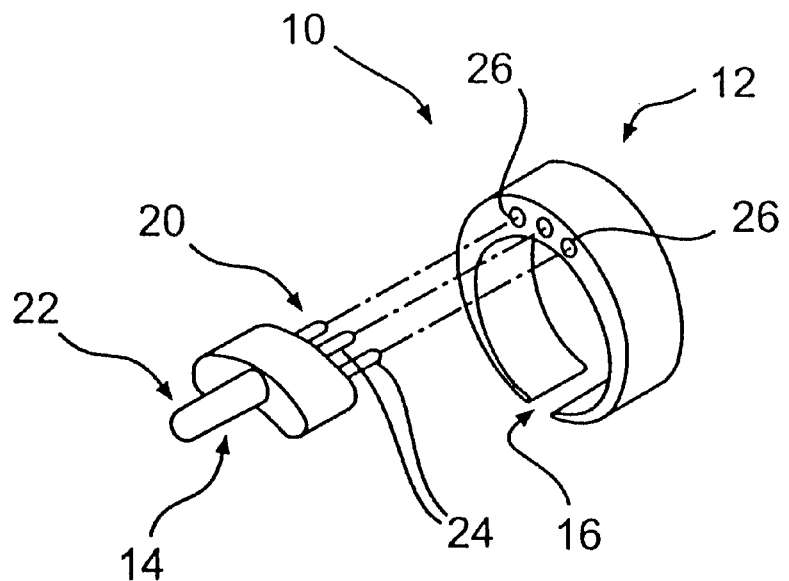
FIG. 3 illustrates an exploded perspective view of a screen operator according to an alternate embodiment of the present invention.
Figure 4:
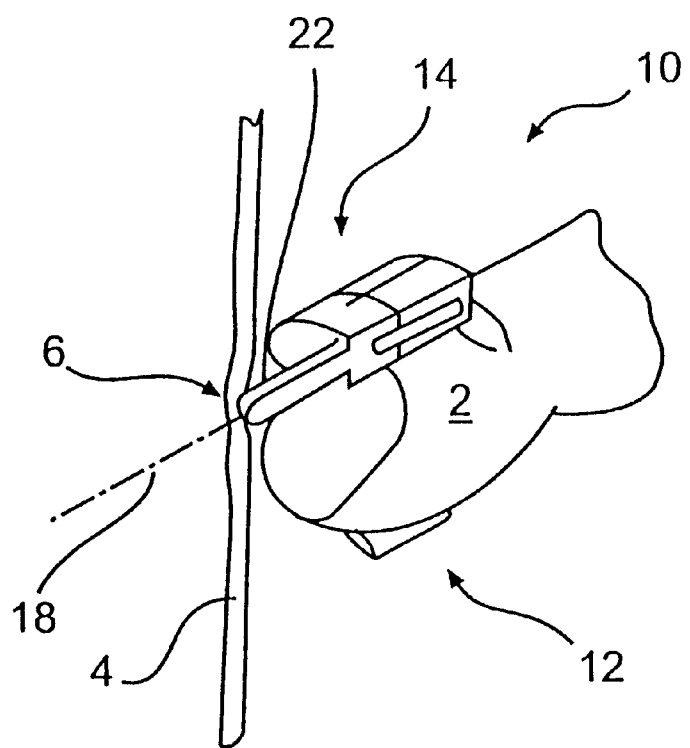
FIG. 4 illustrates an exaggerated, environmental, side elevation view of the device of FIG. 3 drawn partly in cross section.

Referring to FIG. 3, a screen operator 10 according to an alternate embodiment is seen to comprise a base 12 dimensioned and configured to engage the finger of a user (as shown in FIG. 4), and a separate tip member 14 which is removably and manually attachable to the base 12. The base 12 engages the finger by full or partial encirclement. Preferably, the base 12 is generally tubular, other than having a gap 16. As contrasted to a ring that lacks the overall length of a tube, a tubular configuration promotes axial alignment of screen operator 10 with the finger of the user. The central longitudinal axis 18 of the base 12 is shown in FIG. 4. The axis 18 need not necessarily be coaxial with the finger of the user. This characteristic is very helpful in maintaining accuracy of screen operator 10 when in use.

The base 12 is fabricated from a material or materials providing partial rigidity. That is, the base 12 is sufficiently flexible to deform under manual pressure, yet sufficiently rigid to maintain its configuration after deformation in the absence of manual pressure. The gap 16 allows the circumference of the base 12 to be adjusted for different fingers. After the base 12 is placed over a finger (as shown in FIG. 4), it conforms to the finger and maintains its grip by rigidity. Any suitable material exhibiting the above characteristics will be adequate. It is, however, preferred that the base 12 be somewhat flexible and resilient at least at its surface for comfort. One suitable construction is to use a core of bendable metal (not shown) surrounded by flexible rubber-like material, such as soft or foamed synthetic resin (not shown).

The tip member 14 has a connector 20 and a relatively slender rigid projection 22. The connector 20 comprises three male members 24 of a snap-fitting device that cooperate with an equal number of sockets 26 formed in the base 12. Snap fitting devices are manually connectable and detachable, but have sufficient frictional mutual adherence to assure that the tip member 14 will not spontaneously lose operable engagement of base 12. The male members 24 and the sockets 26 are arranged parallel to the axis 18 so that when the tip member 14 is fitted to the base 12, the projection 22 projects forwardly in a direction parallel to the axis 18. It is preferred that plural male members 24 and the sockets 26 be provided, so that plural points of connection are present between the base 12 and the tip member 14. This arrangement assures firstly, that should one male member 24 break off, the screen operator 10 will still be operable, and secondly, that the tip member 14 be predictably and reliably maintained in its forwardly projecting orientation relative to base 12.

Referring to FIG. 4, a screen operator 10 is illustrated in use. The screen operator 10 is slipped over a finger 2 of a user, and may then be placed in contact with screen 4 of a personal data device (not shown in its entirety). Contact at 6 compresses the screen 4, thereby causing microswitches (not separately shown) to close and complete electrical circuits for entering data and carrying out commands. The screen operator 10 may be placed as desired on a finger 2, within limits imposed by length of projection 22.

Figure 5:
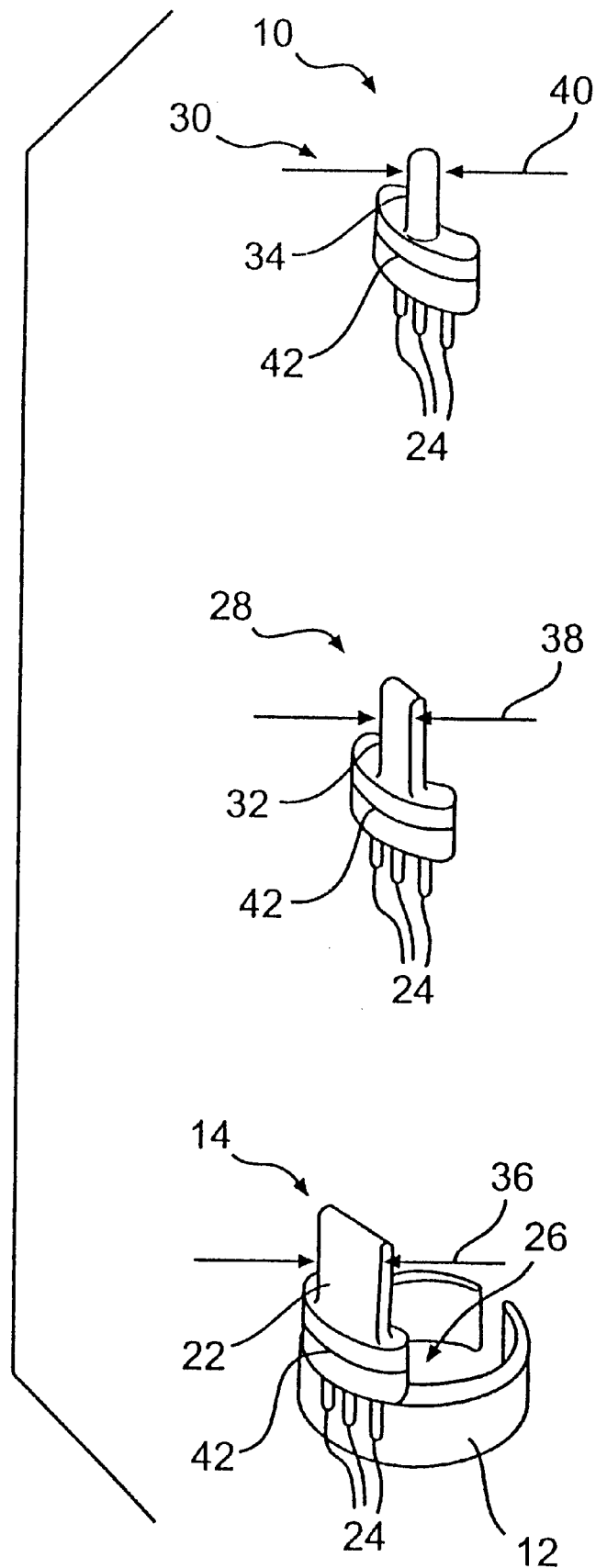
FIG. 5 illustrates a top plan view of the device of FIG. 3 illustrating a plurality of components shown at the left of FIG. 3, wherein each such component differs in dimensions from the others to afford a selection of sizes.

Referring to FIG. 5, a screen operator 10 is seen to include a plurality of tip members 14, 28, 30. The tip members are alike in that each has male connection members 24 matingly compatible with sockets 26 of the base 12. Each tip member 14, 28, or 30 has a first diameter 42 proximate male connection members 24. The diameter 42 is identical or nearly so among all tip members 14, 28, or 30, so that the tip members 14, 28, and 30 are interchangeable.

The tip members 14, 28, 30 differ from one another in that dimensions and configurations of their respective projections 22, 32, 34 are not identical. Each tip member 14, 28, or 30 has a diameter 36, 38, or 40 (respectively) differing in magnitude from those of the other tip members. This difference in diameter provides different areas of contact with the screen 4 (see FIG. 4) corresponding to fine, intermediate, and coarse. All the tip diameters 36, 38, and 40 are smaller in magnitude than that of the first diameter 42. This relationship assures that fine, intermediate, and projections 34, 32, 22 are slender relative to the first diameter 42, so that visibility of the screen 4 is not affected by undue thickness of a projection 22, 32, 34. The projections 22, 32, and 34 may also vary in length independently of variation in relative diameters, if is to be understood that the present invention limited to the embodiments described above, but encompasses any and all embodiments within the scope of the following claims.

The present invention has been described in terms of various embodiments, however, it will be appreciated that various modifications and improvements may be made to the described embodiments without departing from the scope of the invention.

What is claimed is:

1. A screen operator for effecting operative contact with a touch screen, the screen operator comprising:
   a flexible base comprising:
      a pair of opposed arcuate members sized to resiliently grip a finger, each of the arcuate members terminating in an extreme end, the extreme ends being spaced apart from one another by a gap;
   a tip member, engaged with the base, having a slender rigid projection with a tip end, the tip end being sized as a touch screen stylus tip; and
   a retention hook extending away from the tip member to grip an underside of the finger.

2. The screen operator of claim 1, wherein the tip member is engaged with the base via a frictional engagement.

3. The screen operator of claim 1, wherein the tip member is engaged with the base by being integrally formed therewith.

4. The screen operator of claim 1, wherein each of the pair of opposed arcuate members is shaped to engage a surface of the finger.

5. The screen operator of claim 1, further comprising:
   a top member connecting the flexible base to the tip member, the top member extending along an upper surface of the finger.

6. The screen operator of claim 5, wherein the pair of opposed arcuate members flex from their connection at the top member.

7. The screen operator of claim 1, wherein the screen operator is formed of a plastic composition.

8. The screen operator of claim 1, wherein the pair of opposed arcuate members encircle at least halfway around the finger.

9. A finger tip stylus for mounting on a finger of a user and for inputting commands and data to a computer via contact with a touch screen, the finger tip stylus comprising:
   a flexible base comprising:
      a pair of opposed arcuate members sized to resiliently grip the finger, each of the arcuate members terminating in an extreme end, the extreme ends being spaced apart from one another by a gap;
   a tip member, engaged with the base, having a slender rigid projection with a tip end, the tip end being sized for efficacious input contact with a touch screen; and
   a retention hook extending away from the tip member to grip an underside of the finger.

10. The finger tip stylus of claim 9, wherein the tip member is engaged with the base via a frictional engagement.

11. The finger tip stylus of claim 9, wherein the tip member is engaged with the base by being integrally formed therewith.

12. The finger tip stylus of claim 9, wherein each of the pair of opposed arcuate members is shaped to engage a surface of the finger.

13. The finger tip stylus of claim 9, further comprising:
a top member connecting the flexible base to the tip member, the top member extending along an upper surface of the finger.

14. The finger tip stylus of claim 13, wherein the pair of opposed arcuate members flex from their connection at the top member.

15. The finger tip stylus of claim 9, wherein the finger tip stylus is formed of a plastic composition.

16. The finger tip stylus of claim 9, wherein the pair of opposed arcuate members encircle at least halfway around the finger.

17. A screen operator for effecting operative contact with a touch screen, the screen operator comprising:
a flexible base comprising:
a pair of opposed arcuate members sized to resiliently grip a finger, wherein each of the pair of opposed arcuate members is shaped to engage a surface of the finger, and wherein each of the arcuate members terminates in an extreme end, the extreme ends being spaced apart from one another by a gap;
a tip member having a slender rigid projection with a tip end, the tip end being sized as a touch screen stylus tip;
an elongated member connecting the flexible base to the tip member; and
a retention hook extending away from the tip member to grip an underside of the finger;
wherein the flexible base, the tip member, the elongated member, and the retention hook are unitarily formed together as a single piece.

18. A screen operator for effecting operative contact with a touch screen, the screen operator comprising:
a flexible base comprising:
a pair of opposed members sized to resiliently grip a finger in cooperation with one another;
a tip member having a slender rigid projection with a tip end, the tip end being sized as a touch screen stylus tip; and
an elongate top member connecting the flexible base to the tip member, the top member extending along a surface of the finger.

19. The screen operator of claim 18, wherein the pair of opposed members flex from their connection at the elongate top member.

20. The screen operator of claim 18, wherein the pair of opposed members encircle at least halfway around the finger.

21. A screen operator for effecting operative contact with a touch screen, the screen operator comprising:
a flexible base comprising a single arcuate member sized to resiliently grip a finger;
a tip member having a slender rigid projection with a tip end, the tip end being sized as a touch screen stylus tip; and
an elongate member connecting the flexible base to the tip member, the elongate member being adapted to extend along a surface of the finger.

22. The screen operator of claim 21, wherein the arcuate member is unitarily formed together with the elongate member.

23. The screen operator of claim 21, wherein the arcuate member is adapted to encircle at least halfway around the finger.

* * * * *